July 27, 1943.  E. T. WYMAN  2,325,354
PUNCTURE-SEALING PNEUMATIC TUBE
Filed April 23, 1938   2 Sheets-Sheet 1
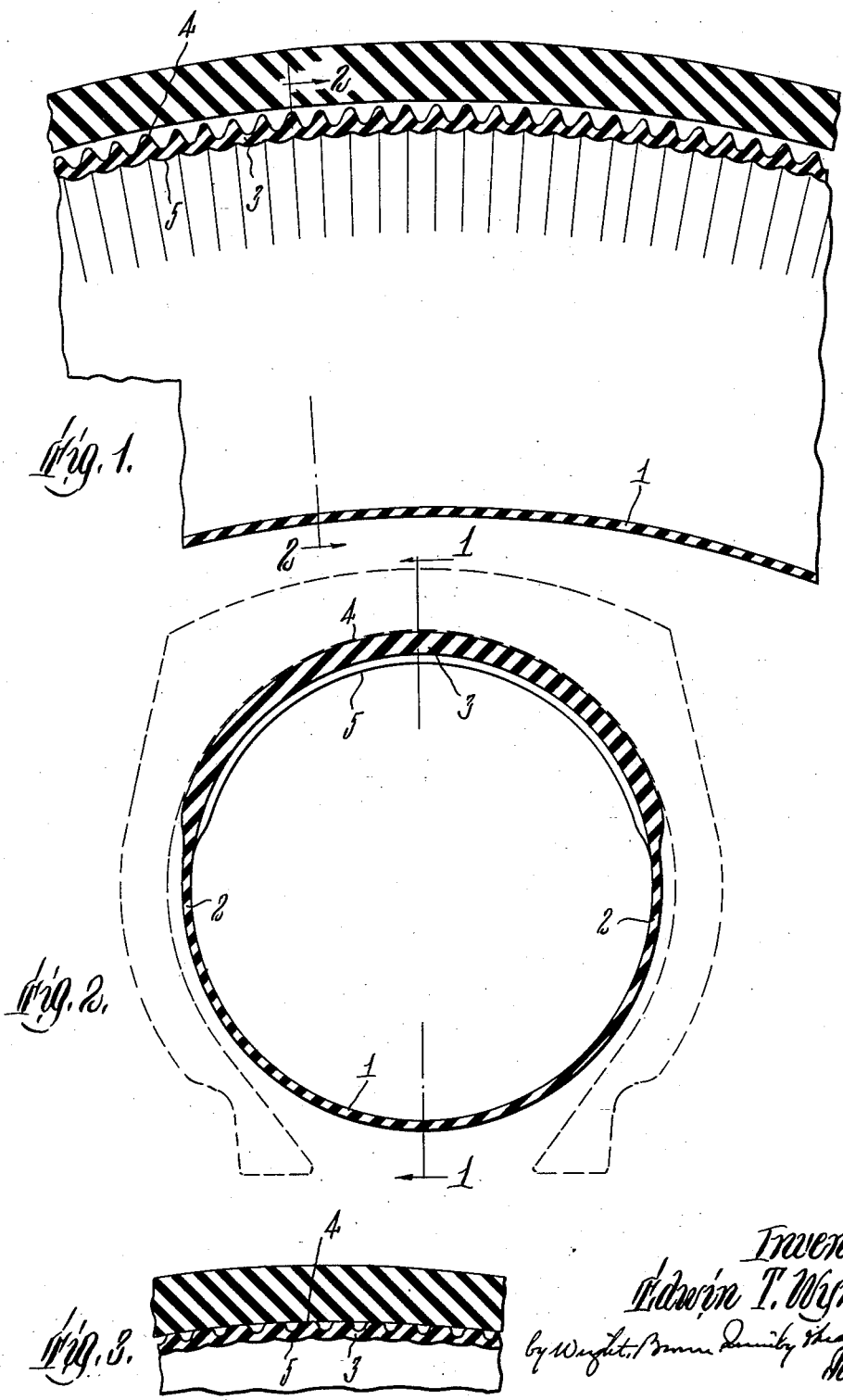

July 27, 1943. E. T. WYMAN 2,325,354
PUNCTURE-SEALING PNEUMATIC TUBE
Filed April 23, 1938 2 Sheets-Sheet 2
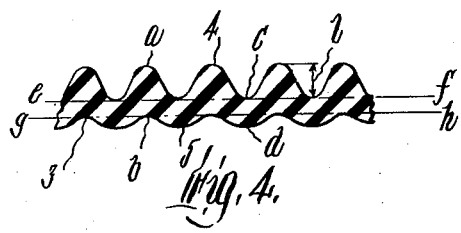
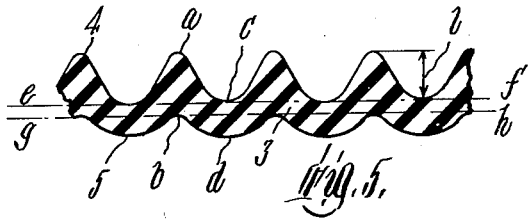
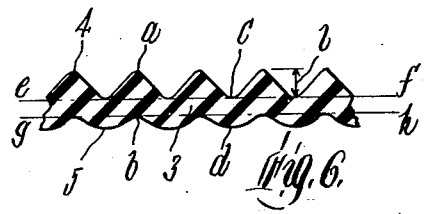
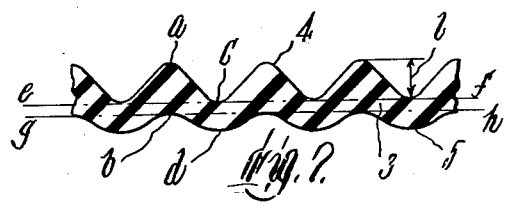
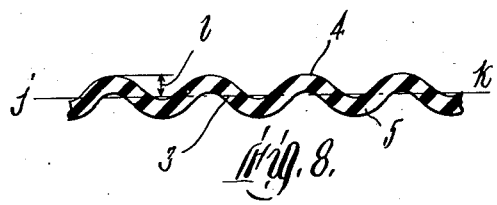
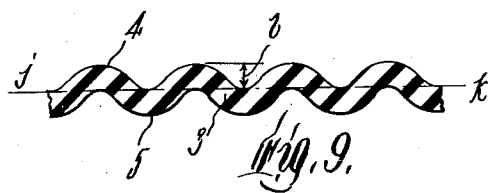
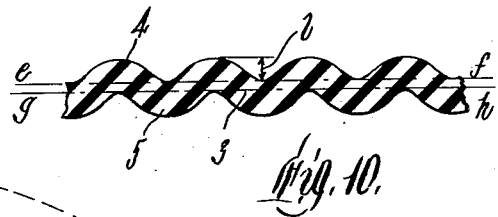
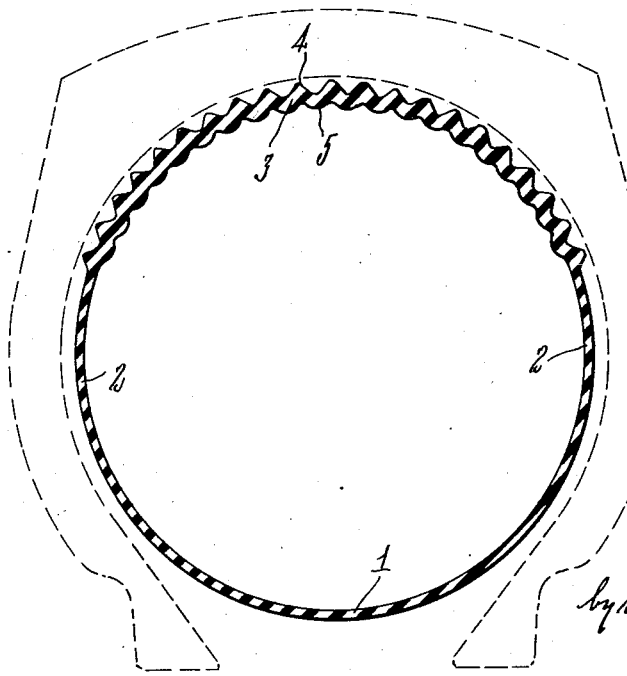
Inventor
Edwin T. Wyman
by Wright Brown Quinby Mary
Attys.

Patented July 27, 1943

2,325,354

UNITED STATES PATENT OFFICE 2,325,354

PUNCTURE-SEALING PNEUMATIC TUBE

Edwin T. Wyman, Brookline, Mass.

Application April 23, 1938, Serial No. 203,832

4 Claims. (Cl. 152—348)

The present invention relates to inner tubes of the self-sealing compression-tread type for pneumatic tires. Its objects are to provide an improved tube of this character which in all embodiments will prevent leakage through a puncture while the puncturing object remains in the hole, and (in tubes having greater than minimum tread thickness) will close the hole substantially leakage tight after the puncturing object has been withdrawn; to insure substantially uniform compression throughout the area of the tread portion of the tube when inflated, preventing folding, overlapping, or creeping of some parts of the tread with failure to effect adequate compression in other parts during inflation; to obtain the foregoing effects with tubes having the same dimensional relationship to the tire shoes or casings as with standard practice heretofore, so that the tubes of the invention can be installed as easily and centered as exactly in the tire shoe cavity as in the best standard practice; to accomplish these ends with the use of but little, if any, more rubber in the tread portion than has been used in standard practice of making non-sealing tubes; and to produce self-sealing tubes inexpensively by standard molding and vulcanizing practices, of light weight, thin enough to avoid danger of undue overheating in service, with the use of conventional molds modified only by formations adapted to impress waves or corrugations into the tread portion of the tube.

Heretofore it has been generally believed that, to obtain compression in the tread of a tube such as to cause automatic sealing of punctures, the tread of the tube must be relatively much thicker than the sides and belly of the tube, and maintained in some manner under compression. This has been accomplished by the use of restrictive fabric strips applied to parts of the tube and, in some cases, by making the tube initially wrong side out and then turning it, whereby the fabric strip imparts a reverse curve to the tread, thus compressing the tread; or by molding the tube in a distorted mold with a built up or thickened and materially widened tread, and perhaps with a reinforcing fabric strip, which tube is subsequently confined between, and the tread compressed by, the walls of the casing or shoe when the tube is inflated. It has also been proposed to make inner tubes of larger dimensions than the interior cavity of the tire casing for which they are designed, so that they will be wrinkled when forced into the tire shoes, and to rely on the inward bends of such over size tubes to create compressive stress in the walls of the tube when inflated within and against the shoe. These various methods all have defects or disadvantages which are avoided by the tubes of my invention.

The invention herein described is essentially and fundamentally the same as that set forth in my Patent No. 2,183,760, granted December 19, 1939, on an application filed August 1, 1936, entitled Pneumatic tube. Its disclosure herein contains specific improvements and refinements developed as the result of tests, experience and observations. As to all common subject matter, the present application is a continuation of the preceding one.

In the accompanying drawings—

Fig. 1 is a fragmentary longitudinal section of a pneumatic inner tube embodying this invention, in a tire shoe of conventional type, prior to inflation. The section is assumed to be taken on a plane perpendicular to the axis, and midway between the opposite sides of the tube, such plane being represented by the line 1—1 of Fig. 2;

Fig. 2 is a cross section on line 2—2 of Fig. 1;

Fig. 3 is a section similar to Fig. 1 showing a fragment of the tread portions of inner tube and tire shoe when the tire has been inflated to a normal service pressure;

Figs. 4, 5, 6, 7, 8, 9 and 10 are fragmentary sectional views on an enlarged scale, of different formations of the tread portions of inner tubes all embodying this invention. These figures illustrate the principles of the invention by showing a few of the many configurations in which the tread portion of the tube may be molded;

Fig. 11 is a view similar to Fig. 2 showing a variation of the invention.

Like reference characters designate the same parts wherever they occur in all the figures.

Tubes containing this invention may be made of any rubber compound, or other composition of matter suitable for pneumatic tubes. For convenience of description they will generally be referred to herein as made of rubber. But since the invention is concerned with the physical characteristics of the tube, not its chemical composition, the term "rubber" is not intended to imply any limitation as to such composition, but is to be construed as embracing generically all compounds of rubber and of rubber-like substances or substitutes which have the qualities of imperviousness, resilience, toughness and pliability suitable for tire tubes of this invention.

Tubes of this invention may be produced by standard practices so as to form a molded, endless, vulcanized tube, substantially circular in cross section, or otherwise formed suitably to conform to the shape of any tire shoe or casing. The belly portion 1 and side walls 2 may be made of any thickness desired, for instance, the minimum thickness known to be suitable for tubes designed to perform certain duties. As an illustration of what such thickness may be, I may say that thicknesses from 1/16" to 1/8" are suitable for passenger automobiles and that greater thicknesses in proportion, and conforming to standard practice, are suitable for trucks and other heavy duty vehicles. The tread portion 3 may be, and preferably is, somewhat thicker than the rest of the tube, say twice as thick, although it need not be materially thicker when the entire tube is made of a thickness which in the tread portion is sufficient for the purpose.

My tube, like those made in standard practice, is of smaller dimensions both circumferentially and transversely than the tire casing for which it is designed to be used. The standard practice is to provide tires and tubes capable of being used on two or more sizes of wheel rim. The inner tubes are made enough smaller than the tire shoes to be capable of placement therein, and centering, without being wrinkled, creased or collapsed. Inflation after placement of the tire on the wheel rim causes the inner tube to be stretched, until it comes to bear all around on the inside of the shoe and the outer surface of the wheel rim. The stretch varies according to the size of the rim on which the tire is placed. Under present practice the longitudinal or circumferential stretch, i. e., that in the direction corresponding to the circumference of a wheel, at the tread of the tube ranges from 2% to 8%, and the transverse stretch of the tube as a whole is from 8% to 28%. Tubes of my invention conform substantially to this standard practice in the relationship of their dimensions to the shoes with which they are intended to be used.

The tread portion 3 of the tube is made with an excess of material in the form of ridges or corrugations both external and internal. The external ridges are designated by the numeral 4 in the drawings and the internal ridges by the numeral 5. In the preferred form of the invention, which is that shown in Figs. 1, 2 and 3, the ridges extend transversely of the tread and are spaced apart longitudinally, (considering the longitudinal dimension as the wheel circumference of the tube) although they may extend circumferentially, as shown in Fig. 11. The rubber composition used for making such tubes, or at least the tread portions thereof, is pliable and elastically deformable in its finished condition, wherefore the ridges are more or less flattened when pressed against the shoe by pneumatic pressure and the compressive stresses thereby developed are transmitted throughout the entire tread. Tubes with such ridged treads may be molded and vulcanized in molds which are like those used in every day practice except that they are provided with grooves shaped to form the external ridges and of depth substantially thicker than the rubber of the tread, so that they permit displacement of the rubber to form the grooves between the internal ridges. Such internal ridges form arches, of which the crests are directed inwardly to a sufficient extent to support the inflation pressure without collapsing.

I prefer to form these ridges so that the thickness of material in the external ridges (this being the thickness between the points $a$ and $b$ in Figs. 4, 5, 6 and 7) is greater than the thickness of material in the troughs or valleys between the external ridges (i. e., the thickness between the points $c$ and $d$). This provides a surplus of material on the outside of the tread which is not flattened materially by stretching alone, within the stretch allowance provided in the design of the tubes, but remains available for the creation and distribution of compression when forced against the tire shoe by pneumatic pressure.

The external ridges are preferably angular in profile with straight flanks and rounded crests and valleys tangent to the flanks. In the form shown in Figs. 1, 4 and 5 the angle included between the flanks of the ridges is 60°. The curvature of the crests and valleys may be made of larger or smaller radius; and Figs. 4 and 5 illustrate some of the possible variations in degree of curvature. The ridge flanks may be disposed at other angles however, but preferably not considerably steeper than 60° nor considerably less steep than 45°. I have shown in Figs. 6 and 7 two forms of ridge having included angles of 90° and a slope on each flank of 45°. Different angles of such prismatic rib formations may be selected for tubes designed to undergo different amounts of stretch; as steeper angles for greater stretch, less steep for less stretch.

However, the invention includes forms in which the ridges or corrugations are made as undulations with constantly reversing curvature and an equal thickness of material in all lines normal to the surfaces of the undulations. Figs. 8, 9 and 10 show three forms of undulating tread which differ from one another in the thickness of the material and consequently in the ratio of such thickness to the spacing between crests and valleys.

When a tube with the configuration shown in Figs. 1 and 4 is forced against the outer shoe by pneumatic pressure of the order of those used in passenger car tires, as 30 to 40 pounds per square inch, the outer ridges are arrested by the tread portion of the shoe, the inner ridges are more or less displaced outwardly (but to a slight extent, at most) into the valleys between the external ridges, and the latter are compressed and partially flattened by the reaction of the shoe. Thereby compression stresses are set up throughout the tread material. The interior arches are more or less flattened, according as the tube is more or less stretched in being inflated, but remain as arches supported by the outer ridges as arch abutments. In any case enough material is provided in the tread to produce the compressive effect described when the tube has stretched as much as permitted by the shoe for which the tube is designed.

The transverse stretch occurs mostly in the sides and belly of the inner tube due to the fact that these parts contain less rubber than the tread. While some stretch of the tread occurs in the transverse direction, it is far less than sufficient to neutralize the compression.

Experience has proved that treads with the proportions shown in any of the figures of the drawings when inflated to the degree prescribed for normal service and punctured, will be pressed tightly enough against the sides of the puncturing object to hold the pressure indefinitely, or at least for many hours while the puncturing object, such as a nail, remains in penetrating position, even though such a nail is inclined back and forth, and otherwise moved, by continued running of the wheel. This is sufficient puncture sealing capability for satisfactory practical use. But more than this, tubes of my invention will hold the pressure equally well after the puncturing object has been withdrawn, provided the puncture is of such a character as to pierce the tube without punching out or removing a piece of the rubber, so that the edges of the hole are enabled to come together upon withdrawal of the puncturing object.

I have found also that there is a critical relationship or limit betwen the thickness of the tread material and the spacing and height of the corrugations, within which the results described are secured. If the rubber is too thin in proportion to the spacing and height of the corrugations, or conversely, if the corrugations are too widely spaced and too high, in proportion to thickness, they cannot be depended on to maintain their equality of spacing when the tire is inflated, but will shift in a random and unpredictable manner. Some of the ridges are forced apart from one another by displacement outwardly of the inward bends, causing other ridges to be forced together with inward displacement of the valley between them and formation of a deep fold. The compression necessary for sealing then is not developed and leakage occurs when the tube is punctured. Or the outer crests may fold or tip over, with resultant lack of controlled compression. Where the spacing between corresponding points on the corrugations is more than six times the thickness of the rubber in the thinnest parts of the tread (generally the bottoms of the exterior valleys) and the height from valley to crest more than four times this thickness, the tubes when punctured are liable to leak from the causes last described.

All the forms illustrated herein are well within the limits indicated. Figs. 1, 4, 6 and 11 represent tubes in which the ridges are spaced ¼" apart and the minimum thickness of the tread is ⅛". Figs. 5 and 7-10 represent treads in which the spacing of the ridges is ⅜", and in all of which, except Figs. 8 and 9, the thickness at the bottom of the exterior valleys is ⅛". The thicknesses represented in Figs. 8 and 9 are respectively 1/16" and 3/32". The scale of Figs. 4-10 inclusive, in the original drawings, is two to one.

In most of these illustrations, the bottoms of the outer valleys do not cross the line tangent to the bottoms of the interior valleys. In other words, there is a solid mass of rubber between the planes or imaginary surfaces tangent to the bottoms of the inner and outer valleys, as is indicated by the broken lines e—f and g—h in Figs. 4, 5, 6, 7 and 10. This is a preferred characteristic of all the thicker tube treads made according to my invention. It is a useful and important characteristic, in that it provides a band of solid material to take the initial stretch of the tube before the ridges come to firm bearing on the shoe, and substantially prevent flattening of the corrugations under tensile strain. However, it is not an essential of the invention, as is made apparent by Fig. 8, where the valleys at opposite sides cross the median line j—k, and Fig. 9 where they are tangent to the corresponding median line.

The height of the corrugations or ridges is the shortest distance between the valley bottoms and the tangent bridging across the crests. It is represented as to the outer ridges by the dimension l in Figs. 4-10, and in these illustrations ranges from about 1½ times the thickness (Figs. 5 and 8) to less than the thickness (Fig. 10). Where the outer ridges have steeper flanks than the inner ridges, as in Figs. 4-7, they are higher than the inner ridges; but where the ridges are undulations of equal normal thickness, the heights of outer and inner corrugations are equal. With such heights being within four times the thickness of the material, and spacing between crests within six times such thickness, the tread, notwithstanding the pliability of the rubber composition, has sufficient stiffness to prevent unequal flattening of different inner bends under pneumatic pressure, and thus prevents spreading apart of some outer ridges and approach to one another of other ridges; causing the relative spacing between the ridges to remain the same. While the stretch of the tube in its initial expansion causes the distance between ridges to be proportionally increased, yet the equality of spacing is not altered.

With a sufficient thickness of material and a sufficient depth of internal arches, such arches maintain their arched formation when the tube is inflated to service pressure within a tire shoe of suitable dimensions. Sufficient stiffness is thus provided to maintain uniform spacing between the external crests or ridges and to cause controlled and equally distributed compression within the material in and between such crests. The lines of compressive force are exerted in directions which cause the material to press forcibly against the sides of an intruded puncturing object; and such directions are controlled by the forms taken by the arches under different degrees of air pressure. These arches of the tube tread are analogous to the arches of a bridge under distributed loading, with this difference that, whereas the bridge is rigid, the rubber arches are flexible and may change their shapes under different loads. The possible thickness which may be given to the material of the tread is limited by several factors, including the fact that objectionable heat is generated by excessively heavy tubes in running at high speed over the road, and the necessity of avoiding excessive cost. Hence the average thickness of the tread must not greatly exceed ⅛". The tubes here described are within these limitations.

In the modification shown in Fig. 11, the ridges or corrugations run circumferentially around the tread, while the spacing between the corrugations is transverse. Such circumferential corrugations may have any of the forms and contours herein shown and described with reference to the transversely extending corrugations, and the same dimensions and proportions of spacing, height and thickness, as previously set forth.

Tubes embodying the invention are free from the objection of liability to overheat, encountered with tubes having reversely curved treads and thick treads. They contain little, or no, more rubber than standard tubes, are light and easy to handle, easy to repair, and are producible at costs little, if at all, greater than the costs of standard tubes.

Variations from the specific dimensions herein shown and described may be made within the range of proportions herein described, without departing from the invention.

What I claim is:

1. A puncture-sealing inner tube for pneumatic tires made of flexible and resilient vulcanized rubber, having a tread portion formed with external ridges and grooves and with inwardly convex arches subtending said grooves, the distance between corresponding points of said ridges being no greater than four times the thickness of the material at the bottom of the grooves, the included angle between the opposite slopes of the ridges being between limits of substantially 90° and substantially 60°, and the internally convex arches having a depth less than said thickness.

2. A puncture-sealing inner tube made of flexible and resilient vulcanized rubber composition having a tread portion formed with external ridges and valleys, and with interior grooves and arches in the same zones with said external ridges and valleys respectively, there being a solid mass of rubber between the imaginary surfaces which are tangent to the bottom of the outer valleys and the bottoms of the internal grooves respectively.

3. A puncture-sealing inner tube made of flexible and resilient vulcanized rubber composition having a tread portion formed with external ridges and valleys, and with interior grooves and arches in the same zones with said external ridges and valleys respectively, there being a solid mass of rubber between the imaginary surfaces which are tangent to the bottoms of the outer valleys and the bottoms of the internal grooves respectively, and the included angle between the slopes tangent to the external ridges and valleys being between limits of substantially 90° and substantially 60°.

4. A puncture-sealing inner tube made of flexible and resilient vulcanized rubber composition having a tread portion formed with external ridges and valleys, and with interior grooves and arches in the same zones with said external ridges and valleys respectively, there being a solid mass of rubber between the imaginary surfaces which are tangent to the bottoms of the external valleys and the bottoms of the interior grooves respectively, the thickness of the rubber between the external valleys and the interior arches being materially less than the thickness of the rubber between the external ridges and the interior grooves.

EDWIN T. WYMAN.